United States Patent Office 2,736,421
Patented Feb. 28, 1956

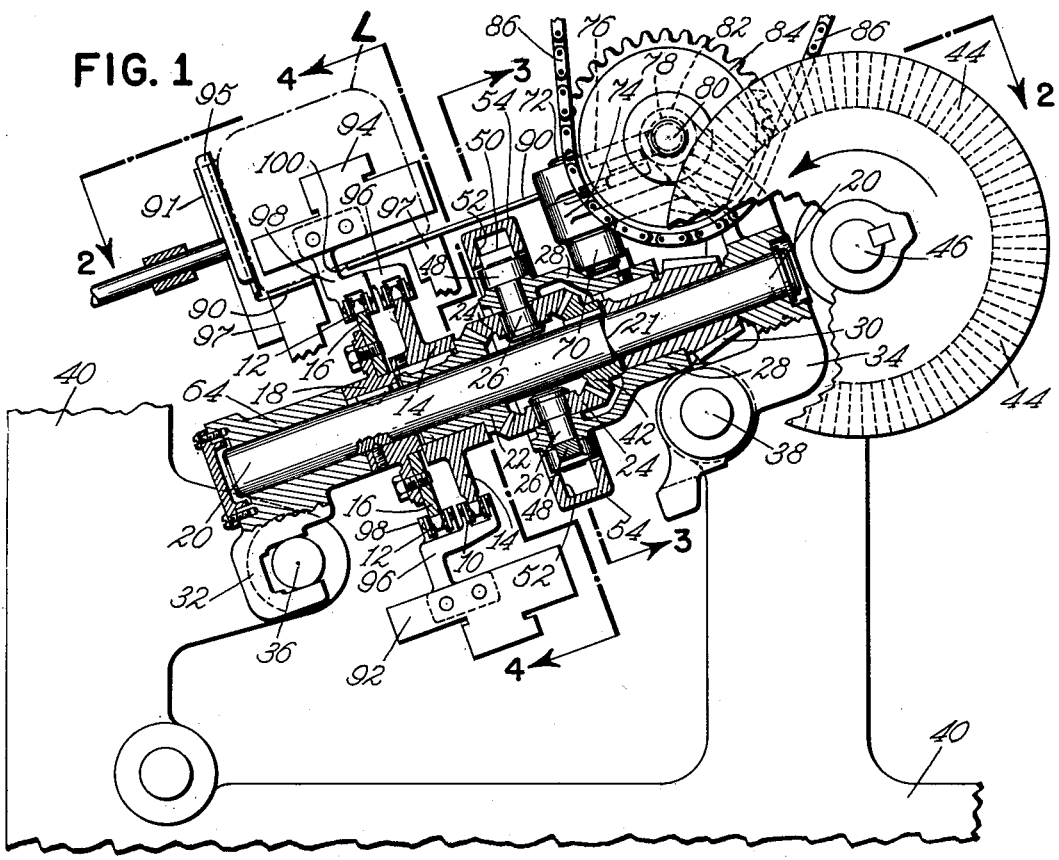
Feb. 28, 1956 — L. R. BELL — 2,736,421
INFEED CONVEYOR FLIGHT ADJUSTING MECHANISM
Filed July 2, 1953 — 2 Sheets-Sheet 1
INVENTOR
LEO R. BELL
BY
Wentworth C. Clapham
ATTORNEY Feb. 28, 1956 L. R. BELL 2,736,421
INFEED CONVEYOR FLIGHT ADJUSTING MECHANISM
Filed July 2, 1953 2 Sheets-Sheet 2
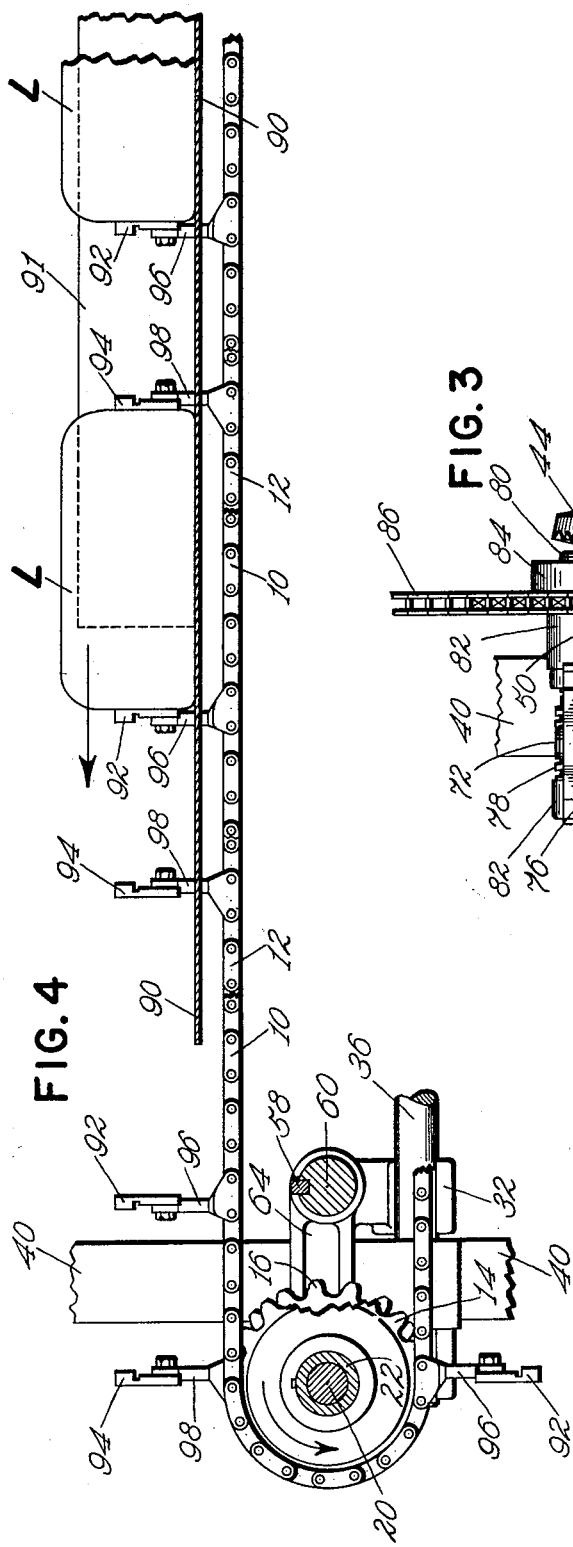
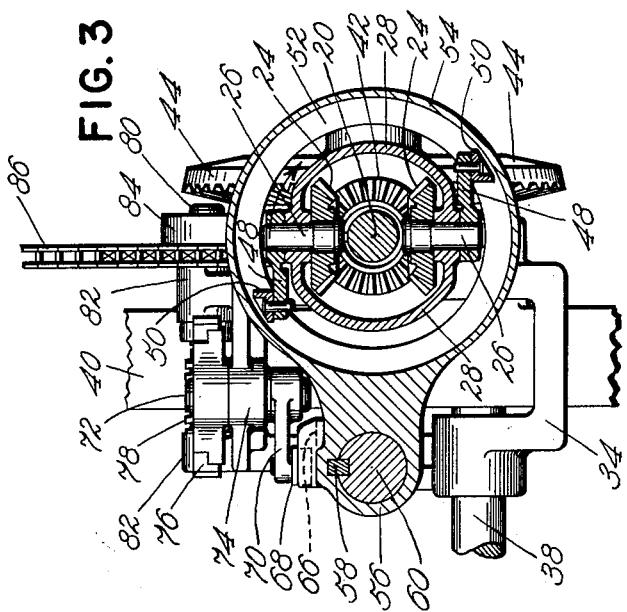
INVENTOR
LEO R. BELL
BY
ATTORNEY

2,736,421

INFEED CONVEYOR FLIGHT ADJUSTING MECHANISM

Leo R. Bell, Snyder, N. Y., assignor to American Machine & Foundry Company, a corporation of New Jersey Application July 2, 1953, Serial No. 365,587

10 Claims. (Cl. 198—168)

This invention relates to wrapping machines, and more particularly to improvements in article feeding and conveying mechanism and to means for automatically adjusting such mechanism to adapt it readily for handling articles of different length.

The invention relates particularly to improvements in bread wrapping machines wherein successions of loaves of different lengths are wrapped, and it is necessary to adjust the infeed flights in order to adapt the flight spacing such that loaves of bread, sliced or unsliced, might readily be inserted therebetween and be conveyed thereby properly into the wrapping machine. In accordance with the invention, means are provided which make it possible to vary the spacing between the sets of spaced conveyor flights during the operation of the infeed conveyor, and either concurrently with or independently of the other adjusting mechanism of the wrapping machine.

It is an object of the invention to provide improved mechanism for adjusting the spacing of the flights of an infeed conveyor of a wrapping machine during the operation of the machine, or the movement of the conveyor of which the flights form a part either as a part of the operations of adjusting the several wrapper folding mechanisms of the machine, or independently thereof.

It is a further object of the invention to provide simplified mechanism for operating the infeed conveyor of a wrapping machine and also to provide simplified mechanism for adjusting the sets of flights of the infeed conveyor to or from each other, the adjusting operations being effected either while the infeed is being driven or when it is stopped.

With these and other objects not specifically mentioned in view, the invention consists in certain constructions and combinations hereinafter fully described and then set forth in the claims hereunto appended.

In the accompanying drawings which illustrate an embodiment of the invention and form a part of this specification, and in which like reference characters designate the same or like parts:

Fig. 1 is a sectional end elevation of a preferred form of the infeed conveyor flight adjusting mechanism;

Fig. 2 is a plan view taken on line 2—2 of Fig 1;

Fig. 3 is a sectional side elevation taken on line 3—3 of Fig. 1; and

Fig. 4 is a partial side elevation taken on line 4—4 of Fig. 1, and showing a part of the infeed conveyor.

In accordance with the invention, there is provided simplified mechanism for moving the chains which support the sets of spaced flights of the infeed conveyor. The chains are movable in opposite directions in order that the spacing between the flights may be adjusted to conform with the length of articles located therebetween and advanced thereby into a wrapping machine. The chains are supported on driving and driven sprockets. One of the driving sprockets is mounted on a hub of a bevel gear supported by a shaft on which the other driving sprocket is keyed. When the hub of the bevel gear and the shaft are turned in opposite directions, the desired adjustment in the spacing of the sets of flights on the conveyor chains is obtained. The bevel gear above referred to meshes with two opposed bevel pinions. The latter also mesh with a bevel pinion keyed to the shaft. Attached to each of the shafts which support the opposed bevel gears is a crank arm. On the free end of each crank arm is mounted a cam follower running in a circular cam slot in an adjusting collar. The crank arms extend in opposite directions so that their positions in the track or cam slot of the adjusting collar are 180° apart. The cam collar or annular adjusting cam forms a part of a bracket splined to a support shaft so mounted that it is parallel to the driving shaft of the chain conveyor. By means of this mechanism, when the circular adjusting collar or annular adjusting ring is moved in either direction along its support shaft, the crank arms turn their respective bevel pinions and in so doing, the hub of the bevel gear and the drive shaft are turned in opposite directions. This effects the desired adjusting movement between the sets of flights of the conveyor chains to or from each other.

The invention is designed primarily for use with a wrapping machine of the general type shown in Werden et al. 2,366,888, or in copending McGinley application, Serial Number 748,715, filed May 17, 1947, now Patent No. 2,650,459, although it may be readily adapted with other types of wrapping machines embodying infeed conveyors for conveying articles such as loaves of bread, sliced or unsliced, into a wrapping machine.

With reference to the drawings, which show a preferred embodiment of the invention, the article infeed conveyor consists of two parallel endless chains 10 and 12 running on suitable idler sprockets (not shown) on driven sprockets 14 and 16, respectively, which are driven intermittently from the main drive shaft of the machine, as described hereinbelow.

Sprocket 16 is secured to a flange formed on a hub 18 keyed to shaft 20. Sprocket 14 is keyed to the hub of a bevel gear 22 which is loosely mounted on shaft 20. Bevel gear 22 meshes with two opposed bevel gears 24 which are supported on stud shafts 26 rotatably mounted on a bell or cup shaped housing 28 keyed to the hub of a bevel gear 30 loosely and rotatably mounted on a reduced portion of shaft 20 and bearing against a shoulder 21 formed on this shaft. Shaft 20 is supported in its end in suitable bearing brackets 32 and 34 mounted on transverse rods 36 and 38, respectively. Rods 36 and 38 are mounted in suitable lugs in main frame 40 of the machine.

As illustrated in Figs. 1 and 3, bevel gears 24 also mesh with bevel gear 42 mounted on shaft 20. Bevel gear 30 meshes with bevel gear 44 keyed to shaft 46 which is intimately driven by means of a suitable Geneva gear (not shown) which may be of the type disclosed in Rumsey Patent 2,607,237, granted August 19, 1952. The Geneva gear is driven from the main drive shaft (not shown) of the wrapping machine.

Each of the two stud shafts 26, to which a bevel gear 24 is secured, has connected thereto a cam arm 48. See Figs. 1, 2 and 3. The free end of each cam arm 48 pivotally supports a suitable shaft cam follower 50 (Fig. 3). These cam followers which are located 180° apart, engage with and run in a U-shaped annular track or ring cam 52 which as disclosed forms an integral part of a bracket 54 having a hub 56 keyed by key 58 for sliding movement along its stationary support shaft 60. Shaft 60 is supported by and secured at its ends to brackets 62 and 64 which are formed integrally with brackets 34 and 32, respectively.

Hub 56 of cam bracket 54 is provided with a track 66 extending across its top portion and at right angles to the axis of shaft 60. A block 68 pivotally mounted on the free end of arm 70 slidably engages and runs in a track 66. Arm 70 (Figs. 2 and 3) is secured to the lower end of shaft 72 mounted in a suitable bearing lug 74 which forms an integral part of bracket 62. Secured to the top end of shaft 72 is a worm wheel sector 76 which meshes with a worm 78 fixed to shaft 80 which is supported by a pair of suitable bearing lugs 82 extending upwardly from bracket 62. Also secured to shaft 80 is a sprocket 84 on which runs a chain 86 running on a suitable manually actuated driving sprocket (not shown).

The articles to be wrapped, such as sliced or unsliced loaves of bread, are fed by means of an inclined chute (not shown) or any other suitable device (not shown) onto conveyor runway 90 and into the pockets formed by spaced flights 92 and 94 attached to flight arms 96 and 98, respectively (Fig. 4). Arms 96 are secured to conveyor chain 10 at equidistantly spaced points therealong. Arms 98 are secured to conveyor chain 12 at equidistantly spaced points therealong. These arms are adapted to extend through a slot 100 in conveyor runway 90 which is supported by suitable brackets 97 mounted on the frame of the machine.

The hand wheel or crank (not shown) may form a part of a single adjustment mechanism of the general construction shown in the above referred to Werden et al. patent or in the above mentioned McGinley co-pending application. Such means make it possible to effect an adjustment not only of the infeed conveyor flights 92, 94 to or from each other as a part of the over-all adjustment of all of the wrapping and sealing elements (not shown) of the machine, but also an independent adjustment of infeed flights 92, 94 to or from each other, as desired.

The novel mechanism for effecting the desired movement of conveyor chains 10 and 12 in order to adjust the spacings between the flights 92 and 94 is effected by turning a suitable hand wheel or crank (not shown) in a clockwise or counter-clockwise direction to drive the driving sprocket (not shown) which turns sprocket 84. When sprocket 84 is driven, shaft 80 moves in the direction in which the hand wheel is turned. Inasmuch as shaft 80 carries worm 78, this motion is transmitted from the latter through worm wheel sector 76 and shaft 72 to arm 70, which through the medium of block 68 attached to arm 70 and engaging track 66, causes hub 56 of cam bracket 54 to move along shaft 60. In this way, any movement of arm 70 results in a concurrent movement of cam bracket 54. Thus, because of the engagement of cam followers 50 with ring cam 52, the movement of cam bracket 54 causes shafts 26 to be rocked, thereby turning bevel gears 24. When bevel gears 24 are turned, this causes a turning of bevel gear 42 in one direction and a turning of bevel gear 22 in the opposite direction. Since as described above, driving sprocket 14 for conveyor chain 10 is mounted on the hub of bevel gear 22, and driving sprocket 16 for conveyor chain 12 is keyed to shaft 20, on which bevel gear 42 is mounted for rotation therewith, the movement of bevel gears 42 and 22 respectively in opposite directions causes flight arms 96 and 98 to be moved either toward or away from each other depending upon the direction in which shafts 26 are turned.

The spacing between flights 92 and 94 which are carried by flight arms 96 and 98, respectively, can be adjusted in order to accommodate the length of article to be delivered into the wrapping machine by the conveyor flights.

Conveyor chains 10 and 12 are driven intermittently by means of bevel gear 44 meshing with and driving bevel gear 30 to which is keyed the bell shaft housing 28. In the illustrated embodiment, the infeed conveyor chains 10 and 12 move in a path substantially at right angles to the length of a wrapping machine. In this way, flights 92 and 94 feed articles to be wrapped into the side of the wrapping machine and into the range of action of a reciprocating plunger 95 which pushes articles to be wrapped between conveyor flights onto a lifter table (not shown) of the wrapping machine.

The invention above described may be varied in construction within the scope of the claims, for the particular embodiments selected to illustrate the invention are but a few of the possible concrete forms which my invention may assume. The invention, therefore, is not to be restricted to the precise details of the structures shown and described.

What I claim is:

1. In an article conveyor having adjacent endless chains and article engaging flights mounted on each chain at equidistantly spaced points therealong, the flights on one chain being so spaced with respect to the flights on the other chain as to provide article receiving and conveying pockets, a drive shaft, a sprocket fixed to said shaft adapted to drive one of said chains, a bevel gear loosely mounted on said drive shaft, a sprocket fixed to said bevel gear and adapted to drive the other of said chains, a bevel gear fixed to said shaft, a pair of opposed bevel gears coupling said loosely mounted and said fixed bevel gears, stud shafts mounting said opposed bevel gears, an operating arm attached to each of said stud shafts, a cam follower on the free end of each of said arms, a ring cam engaged by said cam followers encircling said shaft and mounted for axial movement relative thereto, and means for moving said ring cam to rock said arms and thereby turn said opposed bevel gears and rotate said shaft and said bevel gear loosely mounted on said shaft to turn said sprockets through substantially equal angular distances whereby to vary the spacing between said opposed flights.

2. In an article conveyor having adjacent endless chains and article engaging flights mounted on each chain at equidistantly spaced points therealong, the flights on one chain being so located with respect to the flights on the other chain as to provide article receiving and conveying pockets, a drive shaft, a sprocket fixed to said shaft adapted to drive one of said chains, a bevel gear loosely mounted on said drive shaft, a sprocket fixed to said bevel gear adapted to drive the other of said chains, a bevel gear fixed to said shaft, mechanism for driving said shaft including a driven bevel gear loosely mounted on said shaft, a bell shaped housing encircling said shaft fixed to said bevel gear, an intermittently driven bevel gear meshing with said last-named bevel gear, a pair of opposed bevel gears coupling said first-named bevel gear and said second-named bevel gear, stud shafts mounted in said housing mounting said opposed coupling bevel gears, an operating arm attached to the free end of each of said stud shafts, a cam follower on the end of each of said arms, a ring cam engaged by said cam followers encircling said shaft, and means for moving said ring cam axially along said shaft to turn said opposed bevel gears and rotate said shaft and said bevel gear loosely mounted on said shaft to turn said sprockets substantially equal angular distances to vary the spacing between said opposed flights.

3. In a conveying apparatus having adjacent endless chains, sets of article engaging flights mounted on each chain at equidistantly spaced points therealong, said flights on one chain being so spaced with respect to the flights on the other chain as to provide article receiving and conveying pockets, mechanism for intermittently driving said chains, said mechanism comprising a shaft, a sprocket fixed to said shaft driving one of said chains, a second sprocket driving said second chain, an adjusting device for moving said sprockets in opposite angular directions to vary the spacing between said sets of flights, said device including selectively driven means for turning said sprockets, cam means operatively connected to said selectively driven means, and mechanism for moving said cam means to turn said selectively driven means.

4. In a conveyor having adjacent endless flight supporting means provided with opposed article receiving and conveying flights, driving members around which said means move, a shaft, one of said members being fixed to said shaft, the other of said members being loosely mounted on said shaft, a differential driving and adjusting unit associated with said shaft, including a bevel gear loosely mounted on said shaft, a bevel gear fixed to said shaft, and opposed bevel gears coupling said loosely mounted and said fixed bevel gears, stud shafts mounting said opposed coupling bevel gears, an adjusting arm attached to each of said stud shafts, an adjusting member mounted for axial movement relative to said shaft, and means for moving said member to rock said arms and turn said opposed coupling bevel gears whereby to turn said shaft and said bevel gear loosely mounted on said shaft and move said driving members in opposite directions to vary the spacing between said flights.

5. In an article conveyor having adjacent endless chains and article engaging flights mounted on each chain at equidistantly spaced points therealong, the flights on one chain being so spaced with respect to the flights on the other chain as to provide article receiving and conveying pockets, a drive shaft, a sprocket fixed to said shaft adapted to drive one of said chains, a bevel gear loosely mounted on said drive shaft, a sprocket fixed to said bevel gear and adapted to drive the other of said chains, a bevel gear fixed to said shaft, a pair of opposed bevel gears coupling said loosely mounted and said fixed bevel gears, a rotatable housing, stud shafts rotatably supported in said housing mounting said opposed bevel gears, an operating arm attached to each of said stud shafts, a cam follower on the free end of each of said arms, an adjusting member having an annular track engaged by said cam followers encircling said shaft, means for moving said ring cam axially along said shaft to rock said arms and turn said opposed bevel gears thereby rotating said shaft and said bevel gear loosely mounted on said shaft in opposite directions to turn said sprockets substantially equal angular distances to vary the spacing between said opposed flights, a driven member mounted on said shaft and connected ao said housing, and means for driving said driven member to drive said shaft and move said conveyor to advance articles located between said flights to a point of discharge from said conveyor.

6. In a conveying apparatus having adjacent endless chains, sets of article engaging flights mounted on each chain at equidistantly spaced points therealong, said flights on one chain being so spaced with respect to the flights on the other chain as to provide article receiving and conveying pockets, mechanism for intermittently driving said chains, said mechanism comprising a shaft, a first sprocket on said shaft driving one of said chains, a second sprocket on said shaft driving said second chain, a differential gearing adjusting device for moving said sprockets in opposite angular directions to vary the spacing between said sets of flights, said device including selectively driven opposed bevel gears for turning said sprockets in opposite directions, and means for simultaneously turning said opposed bevel gears to move said sprockets in opposite directions to vary the spacing between said flights.

7. In a conveyor having adjacent endless flight supporting means provided with opposed article receiving and conveying flights, driving members around which said means move, a shaft, one of said members being fixed to said shaft, the other of said members being loosely mounted on said shaft, a differential driving and adjusting unit associated with said shaft, including a bevel gear loosely mounted on said shaft, a bevel gear fixed to said shaft, and opposed bevel gears coupling said loosely mounted and said fixed bevel gears, stud shafts mounting said opposed coupling bevel gears, an adjusting arm attached to each of said stud shafts, and means for moving said adjusting arms in opposite directions to turn said opposed coupling bevel gears whereby to turn said shaft and said bevel gear loosely mounted on said shaft and move said driving members in opposite directions to vary the spacing between said flights.

8. In a conveyor having adjacent endless flight supporting means provided with opposed article receiving and conveying flights, driving members around which said supporting means move, a shaft mounting said members for relative adjusting movement in opposite directions, a differential driving and adjusting unit for said members and said shaft, including a bevel gear loosely mounted on said shaft, a bevel gear fixed to said shaft, and opposed bevel gears coupling said loosely mounted and said fixed bevel gears, adjusting arms for said opposed coupling bevel gears and means for moving said arms in opposite directions to turn said coupling bevel gears and said fixed and said loosely mounted bevel gears to turn said driving members in opposite directions and vary the spacing between said flights.

9. The conveyor defined in claim 8 including means for driving said shaft, said driving means comprising a driven gear loosely mounted on said shaft, a housing secured to said last-named gear, and means on said housing mounting said opposed coupling bevel gears.

10. The conveyor defined in claim 9 wherein said means for moving said adjusting arms includes cam followers mounted on said arms, a ring cam engaged by said cam followers, an adjusting shaft, sprocket and chain means for driving said adjusting shaft, a worm on said adjusting shaft, a worm segment engaging said worm, a shaft mounting said worm segment, a lever on said last-named shaft, a slidable support for said ring cam and means on said lever connecting said lever to said support, whereby when said last-named shaft is turned, said ring cam is moved axially with respect to said first-named shaft to turn said opposed coupling bevel gears to vary the spacing between said flights.

References Cited in the file of this patent

UNITED STATES PATENTS

| | | |
|---|---|---|
| 1,843,453 | Littlefield | Feb. 2, 1932 |
| 2,133,248 | Jones | Oct. 11, 1938 |

FOREIGN PATENTS

| | | |
|---|---|---|
| 355,515 | Great Britain | Aug. 27, 1931 |